United States Patent [19]
Adkins

[11] Patent Number: 5,988,723
[45] Date of Patent: Nov. 23, 1999

[54] TRUCK BED LINER AND MAT ASSEMBLY

[76] Inventor: Gregory Steven Adkins, 29940 W. 95th St., Desoto, Kans. 66018

[21] Appl. No.: 09/089,172

[22] Filed: Jun. 2, 1998

[51] Int. Cl.⁶ .................................................. B62D 33/02
[52] U.S. Cl. ............................................................ 296/39.2
[58] Field of Search .................................. 296/39.1, 39.2

[56] References Cited

U.S. PATENT DOCUMENTS

| H1318 | 6/1994 | Rozenboom et al. | 296/39.2 |
|---|---|---|---|
| 4,396,219 | 8/1983 | Cline | 296/39 |
| 4,802,705 | 2/1989 | Elwell | 296/39.2 |
| 4,944,612 | 7/1990 | Abstetar et al. | 296/39.2 |
| 5,007,670 | 4/1991 | Wise | 296/39.1 |
| 5,370,436 | 12/1994 | Martindale et al. | 296/39.2 |
| 5,597,194 | 1/1997 | Daugherty et al. | 296/39.2 |

*Primary Examiner*—Joseph D. Pape
*Attorney, Agent, or Firm*—Goldstein & Canino

[57] ABSTRACT

An integral truck bed liner and mat assembly for installing into a bed region of a pickup truck for protecting the painted surfaces of the bed region from damage while at the same time providing a non-slip surface area for stored cargo items. The integral truck bed liner comprises a base liner, a pair of opposed upstanding liner walls which extend upward perpendicular to the base liner, a header liner having opposite ends, the header liner affixed at each end to one of the upstanding liner walls and also extending upward from the base liner. A base mat which has a serrated top surface is secured to the base liner, the serrated top surface providing traction so that when cargo items are placed upon it when the device is installed into the bed region of the truck, the cargo items will not shift or slide while the vehicle is underway, but rather will remain safely stationary.

1 Claim, 2 Drawing Sheets

ര,988,723

TRUCK BED LINER AND MAT ASSEMBLY

FIELD OF THE INVENTION

The invention relates to an integral truck bed liner and mat assembly. More particularly, the invention relates to a protective combined truck bed liner and mat assembly which functions to protect the finish of the bed of a pick-up truck while at the same time providing a non-skid surface so that items may be placed within said bed without the danger of such items shifting or moving therein.

BACKGROUND OF THE INVENTION

Removable liners for pick-up truck beds are well known the art. These devices typically have been used to protect the painted surfaces of the truck bed from scratches, dents and the like so that the vehicle may be used to haul cargo without causing damage thereto. In addition, these devices are utilized to protect the truck bed against the harmful effects of the weather, and to provide a neat, clean aesthetic appearance to the vehicle. These devices typically comprise a thin, hard plastic material which is affixed to the bed and bed-side walls of the truck to insulate these surfaces from damage caused by sliding cargo.

While standard bed liners do indeed serve their intended purpose of protecting the painted surfaces of the truck bed, they nevertheless prove troublesome in that they allow cargo which is placed thereupon to slide around the truck bed interior. To combat this problem, truck bed mats have been developed which, when placed upon the unprotected bed floor, provide a non-slip surface which prevents cargo items from sliding and shifting thereupon. Truck users often find themselves installing a truck bed liner and then purchasing a separate truck bed mat and placing the mat upon the slick surface of the bed liner. While cargo items are accordingly prevented from sliding upon the surface of the bed mat, the slick properties of the liner allow the bed mat unit to slide about in the truck bed interior. What is needed is an integral bed liner-mat assembly which, while protecting the painted surfaces of the truck bed interior also prevents cargo items from shifting and sliding within the bed interior.

While these prior art units may be suitable for the particular purpose employed, or for general use, they would not be as suitable for the purposes of the present invention as disclosed hereafter.

SUMMARY OF THE INVENTION

The present invention relates to a protective combined truck bed liner and mat assembly which functions to protect the finish of the bed of a pick-up truck while at the same time providing a non-skid surface so that items may be placed within said bed without the danger of such items shifting or moving therein.

In accordance with the invention, there is provided a truck bed liner and mat assembly which serves to protect the painted surfaces of the truck bed interior from scratches, dings and dents.

Further in accordance with the invention, there is provided a truck bed liner and mat assembly which prevents cargo items from dangerously shifting and sliding about the truck bed interior while the vehicle is underway.

Further in accordance with the invention, there is provided a truck bed liner and mat assembly which serves to protect the truck bed from the harmful effects of inclement weather.

Further in accordance with the invention, there is provided a truck bed liner and mat assembly which provides a neater and cleaner overall appearance to the vehicle to which it is applied.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
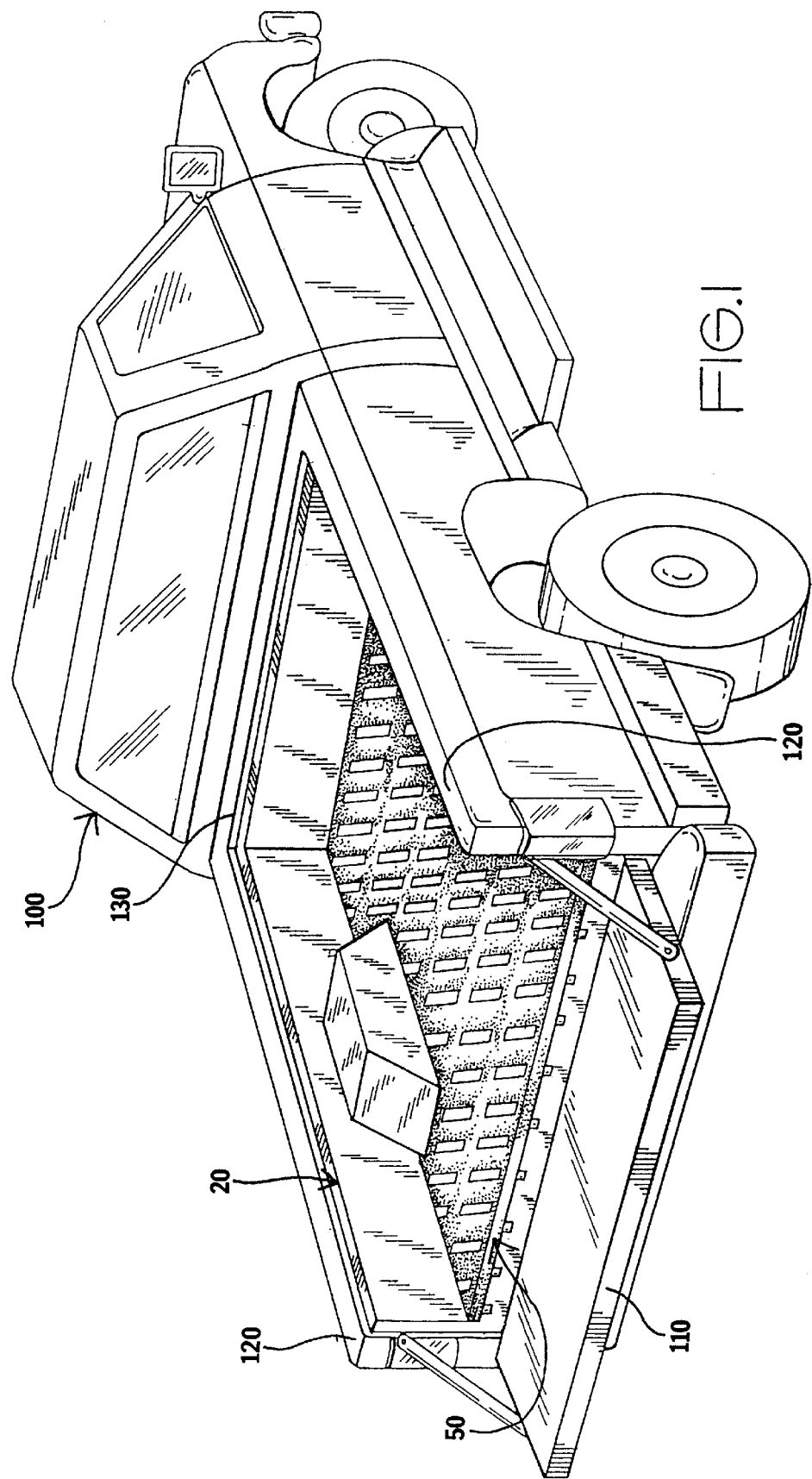
FIG. 1 is a diagrammatic perspective view of the integral truck bed liner and mat assembly of the instant invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the invention. The words "proximal end" and "distal end" refer, respectively, to ends of an object nearer to and further from the operator of the object when the object is used in a normal fashion or as is described in the specification.

Figure 2:
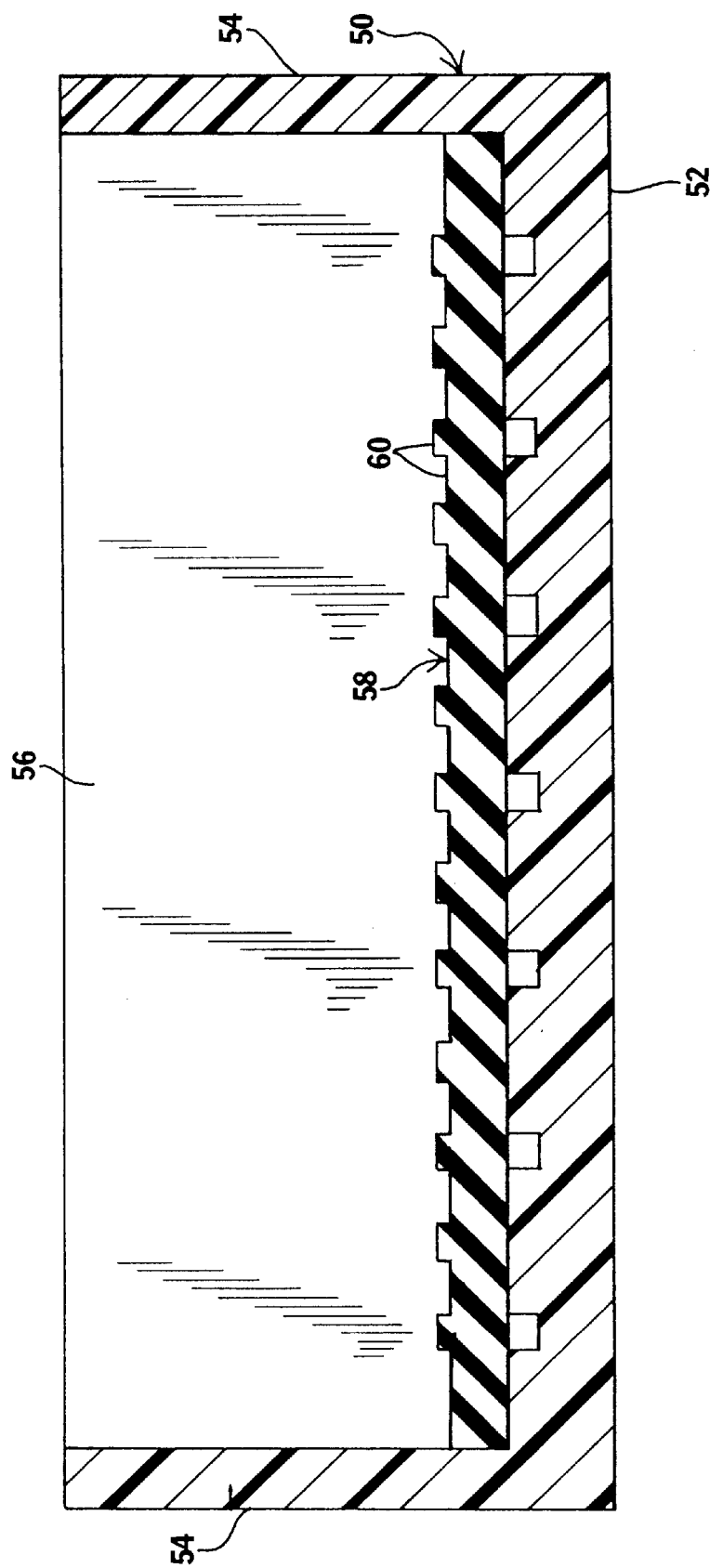
FIG. 2 is a cross sectional view of the integral truck bed liner and mat assembly of the instant invention.

FIG. 1 illustrates a pickup truck 100 with an integral truck bed liner and mat assembly 20 of the instant invention installed thereto. As illustrated, the pickup truck 100 comprises a gate 110, a pair of opposed fender walls 120 and a header wall 130, all of which define a recessed bed region 140. To protect the finished surfaces of the recessed bed region 140, an integral truck bed liner and mat assembly 50 of the instant invention is installed therein, as shown in FIG. 1. A cross section view of the integral truck bed liner and mat assembly 50 is shown in FIG. 2. As illustrated thereat, the integral truck bed liner and mat assembly 50 comprises a base liner 52, a pair of opposed upstanding liner walls 54 which extend upward perpendicular to the base liner 52, and a header liner 56 having opposite ends, which is affixed at each end to one of the upstanding liner walls 54 and also extends upward from the base liner 52. A base mat 58 is secured to the top of the base liner 52, said base mat 58 having a serrated top surface 60 to provided resistance to any cargo which may be placed thereupon and have a tendency to shift or slide.

By installing the integral truck bed liner and mat assembly 50 into the bed region 140 of the truck 100 as seen in FIG. 2, the painted surfaces of the bed region 140 are protected, while at the same time providing a non-slip surface for any cargo items which are placed thereupon. Accordingly, a neat, aesthetically pleasing appearance is achieved while serving multiple functions.

What is claimed is:

1. An integral truck bed liner and mat assembly for installing into a bed region of a pickup truck for protecting the painted surfaces thereof from damage while at the same time providing a non-slip surface area for stored cargo items, comprising:

a) a base liner;

b) a pair of opposed upstanding liner walls which extend upward perpendicular to the base liner;

c) a header liner having opposite ends, which is affixed at each end to one of the upstanding liner walls and also extends upward from the base liner; and d) a base mat which has a serrated top surface, said base mat secured to the base liner.

* * * * *